(12) United States Patent
Firl et al.

(10) Patent No.: US 11,901,588 B2
(45) Date of Patent: Feb. 13, 2024

(54) OFFSET POLE SOCKET AND ENERGY STORAGE SYSTEM COMPRISING THE SAME

(71) Applicant: Clarios Germany GmbH & Co. KG, Hannover (DE)

(72) Inventors: Julian Firl, Giesen (DE); Anne-Laure Ledoux, Langenhagen (DE); Andreas Dudenbostel, Neustadt am Rubenberge (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 98 days.

(21) Appl. No.: 17/436,261

(22) PCT Filed: Mar. 6, 2020

(86) PCT No.: PCT/EP2020/056020
§ 371 (c)(1),
(2) Date: Sep. 3, 2021

(87) PCT Pub. No.: WO2020/178428
PCT Pub. Date: Sep. 10, 2020

(65) Prior Publication Data
US 2022/0166118 A1 May 26, 2022

(30) Foreign Application Priority Data
Mar. 7, 2019 (DE) .......................... 102019105782.5

(51) Int. Cl.
*H01M 50/552* (2021.01)
*H01M 10/06* (2006.01)
*H01M 50/543* (2021.01)

(52) U.S. Cl.
CPC .......... *H01M 50/561* (2021.01); *H01M 10/06* (2013.01); *H01M 50/543* (2021.01); *H01M 2220/20* (2013.01)

(58) Field of Classification Search
None
See application file for complete search history.

(56) References Cited

U.S. PATENT DOCUMENTS 5,499,449 A * 3/1996 Carter ................. H01M 50/567
29/520
6,440,180 B2 * 8/2002 Iwamura ............. H01M 50/598
429/178

(Continued)

OTHER PUBLICATIONS

International Search Report and Written Opinion of the International Searching Authority dated May 25, 2020 for PCT/EP2020/056020 filed Mar. 6, 2020 (translation included).

*Primary Examiner* — Gregg Cantelmo
(74) *Attorney, Agent, or Firm* — Boardman & Clark LLP

(57) ABSTRACT

Disclosed is a pole socket for an energy storage system, having a connecting element with a first end region and with a second end region, a connection element which is arranged on the first end region and which is configured to make electrical contact with electrical consumers, and a contacting element which is arranged on the second end region of the connecting element and which is configured to make electrical contact with a pole shaft. The connection element extends in a first direction of extent proceeding from the connecting element, and wherein the contacting element extends in a second direction of extent proceeding from the connecting element. The second direction of extent runs parallel and in the opposite direction with respect to the first direction of extent, such that the contacting element is arranged offset from the connection element.

18 Claims, 5 Drawing Sheets

(56) References Cited

U.S. PATENT DOCUMENTS

| | | | |
|---|---|---|---|
| 6,602,638 B1 * | 8/2003 | Evans | H01M 50/567 |
| | | | 429/183 |
| 7,070,441 B1 * | 7/2006 | Gregory | H01M 50/172 |
| | | | 429/182 |
| 7,838,145 B2 * | 11/2010 | Ratte | H01M 50/561 |
| | | | 429/178 |
| 7,905,384 B1 | 3/2011 | Spiegelberg et al. | |
| 2013/0052519 A1 * | 2/2013 | Streuer | H01M 50/561 |
| | | | 429/178 |

\* cited by examiner

SCHNITT A-A

OFFSET POLE SOCKET AND ENERGY STORAGE SYSTEM COMPRISING THE SAME

CROSS-REFERENCE TO RELATED APPLICATIONS

This application is a national phase filing of International Patent Application No. PCT/EP2020/056020, entitled "OFFSET POLE SOCKET AND ENERGY STORAGE SYSTEM COMPRISING THE SAME," which has an international filing date of Mar. 6, 2020, which claims priority to German Patent Application No. 102019105782.5 filed Mar. 7, 2019, the entire contents of each of which is hereby incorporated herein by reference for all purposes.

The present invention relates to offset pole sockets for an energy storage system, in particular for a lead-acid energy storage system, and to an energy storage system having the same.

Conventionally, offset pole sockets, that is to say pole sockets in the case of which the position at which current is introduced into the pole socket is arranged offset from the position from which current is conducted out of the pole socket, are cast integrally from the solid and, in order to be inserted into a housing of an energy storage system, are surrounded by or overmolded with housing material. A multiplicity of projections is provided for sealing off the energy storage system.

However, this disadvantageously has the effect that the conventional offset pole socket has a high weight, as a result of which the energy density of the lead-acid energy storage system is reduced overall. Furthermore, regions with high lead accumulation have the effect that voids and air and/or gas inclusions form, whereby the mechanical properties of the offset pole socket are reduced. Shrinkage cracks and shrinkage inclusions can also form in precisely those regions, and these likewise have an adverse effect on the mechanical properties of the pole socket and thus also reduce the electrical conductivity of the pole socket overall.

The present invention is therefore based on the object of providing improved pole sockets for energy storage systems which do not have the disadvantages of conventional pole sockets, and which in particular have a lower weight whilst having improved mechanical properties and/or improved sealing properties, at least in the inserted state.

The object on which the invention is based is achieved by means of the subjects of the independent patent claims 1, 4 and 19. Advantageous refinements are specified in the dependent claims.

Accordingly, an offset pole socket for an energy storage system, in particular for a lead-acid energy storage system, is claimed, which pole socket has the following: a connecting element with a first end region and with a second end region situated at least substantially opposite the first end region, a connection element which is arranged on the first end region of the connecting element and which is configured to make electrical contact with electrical consumers, and a contacting element which is arranged on the second end region of the connecting element and which is configured to make electrical contact with a pole shaft. Here, the connection element extends in a first direction of extent proceeding from the connecting element, and the contacting element extends in a second direction of extent proceeding from the connecting element, wherein the second direction of extent runs parallel and in the opposite direction with respect to the first direction of extent, specifically such that the contacting element is arranged offset from the connection element. The connection element has an upper region for making contact with the electrical consumers and a lower region which is configured to engage with a material of a housing, wherein at least one groove is arranged in the lower region.

The advantages of the invention are evident. The arrangement of grooves in a region below the connection region ensures an improved securing action with respect to tensile loads. In particular if the offset pole socket has a waisted configuration such that the connecting element (in a plan view of the pole socket) has a width that is smaller than a diameter of the connection element and/or smaller than a diameter of the contacting element, the security against detachment of the offset pole socket from a housing of the energy storage system in the event of tensile loads is increased.

In addition, at the same time, material can be saved, as a result of which the offset pole socket becomes lighter, specifically without the mechanical properties of the pole socket being adversely affected, which saves material costs. On the contrary, by means of the shape of the offset pole socket according to the invention, the formation of voids or the formation of air and/or gas inclusions, as well as shrinkage cracks and shrinkage inclusions, can be avoided, whereby fewer rejects are produced. This advantageously reduces production times and costs.

According to a further aspect, the groove may be of encircling form around at least the connection element, and in particular of at least substantially encircling form around the connection element, the connecting element and the contacting element. This leads to better securing of the offset pole socket with respect to tensile loads. In particular, the developed length of the groove can be lengthened by virtue of the offset pole socket being of waisted configuration such that the connecting element (in a plan view of the pole socket) has a width which is smaller than a diameter of the connection element and/or smaller than a diameter of the contacting element, which leads to a further increase in the bending resistance and the resistance to detachment in the event of tensile load.

According to a further aspect, the lower region of the connection element may have an additional groove which is of encircling form around at least the connection element, which leads to a further increase in security with respect to tensile loads.

The object on which the invention is based is furthermore achieved by means of a pole socket for an energy storage system, in particular for a lead-acid energy storage system, as claimed in claim 4. Here, the pole socket has the following: a connecting element with a first end region and with a second end region situated at least substantially opposite the first end region, a connection element which is arranged on the first end region of the connecting element and which is configured to make electrical contact with electrical consumers, and a contacting element which is arranged on the second end region of the connecting element and which is configured to make electrical contact with a pole shaft. Here, the connection element extends in a first direction of extent proceeding from the connecting element, and the contacting element extends in a second direction of extent proceeding from the connecting element, wherein the second direction of extent runs parallel and in the opposite direction with respect to the first direction of extent, specifically such that the contacting element is arranged offset from the connection element. The contacting element has a labyrinth region in which at least one projection with at least one undercut is formed.

As a result, when the offset pole socket is in the inserted state, an interior space enclosed by a housing of the energy storage system is sealed off from the external environment, whereby leakage can be prevented. This eliminates the need to treat the sealing region with an environmentally harmful coating, which on the one hand protects the environment and on the other hand shortens the production time and thus saves costs. The sealing path can advantageously be lengthened with the aid of the at least one undercut.

According to one aspect, at least one projection may be of fully encircling form, which leads to an improved sealing action.

According to one aspect, a projection (in particular a projection arranged under a fully encircling projection) may be of intermittent and/or spiral-shaped encircling form.

According to one aspect, at least one projection may have a symmetrical cross section, which is in particular of at least substantially arrow-shaped or T-shaped form. In this way, it is advantageously possible to achieve an increased sealing action, with a simultaneously simple manufacturing process.

According to one aspect, at least one projection may have an asymmetrical cross section, which is in particular of L-shaped or C-shaped form, whereby an improved sealing action can be achieved.

According to one aspect, the pole socket may have a waisted configuration, specifically such that a width of the connecting element is smaller than the diameter of the connection element and/or smaller than the diameter of the contacting element. This can advantageously have the effect that, on the one hand, material and thus weight are saved, and on the other hand, voids and/or other gas and/or air inclusions or shrinkage cracks form. Furthermore, by means of the waisted configuration of the pole socket, improved security against detachment of the offset pole socket from the housing in the event of tensile loads can be achieved (in particular in connection with the arrangement of a groove that at least substantially fully encircles the connection element, the contacting element and the connecting element).

According to a further aspect, it is possible here for at least one side of the connecting element to be of rectilinear form and/or for at least one side of the connecting element to be of curved form. It is thus advantageously further possible for material and thus weight to be saved and for the developed groove length to be lengthened, which leads to secure positioning and improved security with respect to tensile loads.

According to a further aspect, the connection element may be of single-part form, and in particular in the form of a cone, which is easy to manufacture and can thus advantageously reduce the manufacturing time and costs.

According to a further aspect, the connection element may be of at least two-part form, wherein at least one threaded insert is encapsulated by a region of the connection element. In this way, an electrical connection between the offset pole socket and electrical connectors can be provided easily by means of screw-nut connections, which can be quickly installed and easily changed.

According to a further aspect, the connection element, the connecting element and the contacting element may be of integral form, which can be produced easily and inexpensively.

According to a further aspect, the pole socket may be configured to be cast into or overmolded with a housing of the energy storage system, in particular into or with a cover element of the energy storage system. Simple and secure positioning of the offset pole socket can thus be ensured.

According to a further aspect, the connection element may have a recess. Material can thus advantageously be saved, whereby the weight of the pole socket can be reduced by up to 25%.

According to a further aspect, the contacting element may have a through opening. In this way, simple and secure electrical contacting with a pole shaft or cell connector can advantageously be established and ensured.

According to a further aspect, the through opening may be of tapering form, whereby the introduction of the pole shaft or cell connector can be simplified, which can advantageously reduce the assembly time and costs.

According to a further aspect, the through opening may be formed such that the through opening has at least two regions of different inclination, or the through opening may be of continuously tapering form. This also leads to improved assemblability and a reduction in assembly time and costs.

According to the subject matter of claim 19, the object on which the invention is based is achieved by means of an energy storage system having at least one pole socket described above. Here, the energy storage system has a housing and a multiplicity of energy storage cells that are arranged in the housing. The pole socket is arranged and received in a housing part, in particular in a cover element of the housing, specifically such that an interior space of the housing is sealed off from an external environment by means of the pole socket, and wherein the pole socket is electrically connected to the multiplicity of energy storage cells and is electrically connectable to electrical consumers. In this way, it is advantageously possible to create an energy storage system, the pole socket of which seals off the interior space of the energy storage system in an advantageously effective manner and furthermore provides improved resistance with respect to tensile loads and to detachment of the pole socket from the housing. Owing to the asymmetrical outline of the pole socket, a rotation-preventing securing action is ensured at the same time, which leads to secure and simple positioning. This advantageously reduces the production and assembly time as well as the costs associated therewith.

The invention will be discussed in more detail below, with regard also to further features and advantages, on the basis of the description of embodiments and with reference to the appended drawings.

Figure 1A:
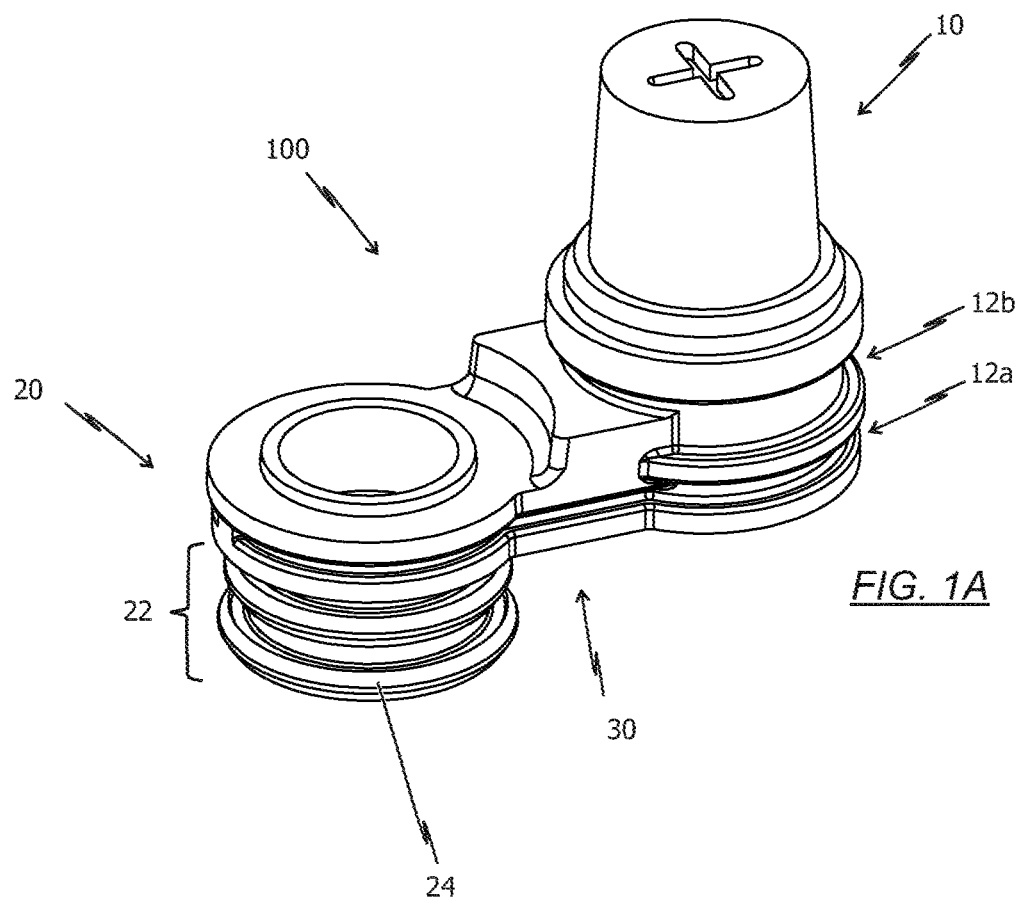
FIG. 1A is a perspective illustration of a first embodiment of the offset pole socket.

Aspects of the offset pole socket according to the invention will be described in more detail below with reference to the illustrations in FIGS. 1A to 3D. Identical or equivalent elements and functions are denoted by the same or similar reference designations.

Energy storage systems based on lead-acid technology are particularly suitable for use as starter batteries in vehicles. Furthermore, such an energy storage system may likewise be used wherever relatively high currents are required in a short period of time.

In the following, the energy storage system will be described in such a way that relative terms refer to the installed state of the energy storage system. For example, "in an upper region" means in an upper region as seen in the installed state, "in a lateral region" means in a region which is located in a front, rear, left-hand or right-hand region as seen in the installed state and in a direction of travel, and "in a lower region" means in a lower region as seen in the installed state.

Energy storage systems which are equipped with an offset pole socket according to the present invention are used in particular as starter batteries in vehicles. Here, the energy storage system may be arranged in a front region of the vehicle as seen in the direction of travel, in a rear region of the vehicle and/or in a region below the seats, in particular below the driver's seat.

The vehicle may be an aircraft or watercraft, a track-bound vehicle, an off-road vehicle or preferably a road-going vehicle, wherein a road-going vehicle can be understood to mean a passenger motor vehicle, a heavy goods vehicle, a bus or a recreational vehicle.

If the energy storage system is used in a heavy goods vehicle, it is also conceivable for said energy storage system to be arranged at a location outside the driver's cab, and in particular to be able to be attached to a fifthwheel pick-up plate of the heavy goods vehicle.

Here, the energy storage system may be based on lead-acid technology. It is however also conceivable that the energy storage system is based on other technologies such as NiMH, lithium-ion or nickel-cadmium technology.

Here, an energy storage system according to the present invention has a housing 200 and a multiplicity of electrochemical cells which are arranged and received in the housing. The housing 200 may be divided here into a housing lower part and a cover or cover element, which are connectable to one another such that the interior space is closed off and sealed off from an external environment. Here, the housing 200 may in particular be manufactured from an electrically insulating plastics material. Here, a positive and a negative terminal, for example in the form of a positive and a negative pole socket 100, are inserted in the housing 200, in particular inserted in the cover of the housing 200. The electrochemical cells each have a positive pole and a negative pole. The electrochemical cells are electrically connected to one another by means of cell connectors. For the electrical connection to (external) electrical consumers, the final positive or negative cell connector is configured as a respectively positive or negative pole shaft or is connected to a respectively positive or negative pole shaft. The positive or negative pole shaft is inserted into and connected to a respectively positive or negative pole socket 100 described in more detail below. Here, the connection may in particular be of cohesive form, produced for example by welding. Here, the positive or negative pole socket may constitute the respectively positive or negative terminal of the energy storage system.

According to the invention, the pole socket 100 is an offset pole socket 100. In this context, an offset pole socket is understood to mean a pole socket in the case of which current is introduced in a region which is arranged offset in at least one direction from a region in which current is conducted out.

The offset pole socket 100 according to the invention has the advantage here that the region where the pole shaft is to be connected to the pole socket is exposed and is easily accessible for a tool (for example a welding tool). This advantageously simplifies the assembly of the energy storage system.

FIGS. 1A to 1D show a first embodiment of the offset pole socket 100 in the non-inserted state. FIG. 2 shows the offset pole socket 100 according to the first embodiment in a state in which it has been inserted in the housing 200.

Figure 2:
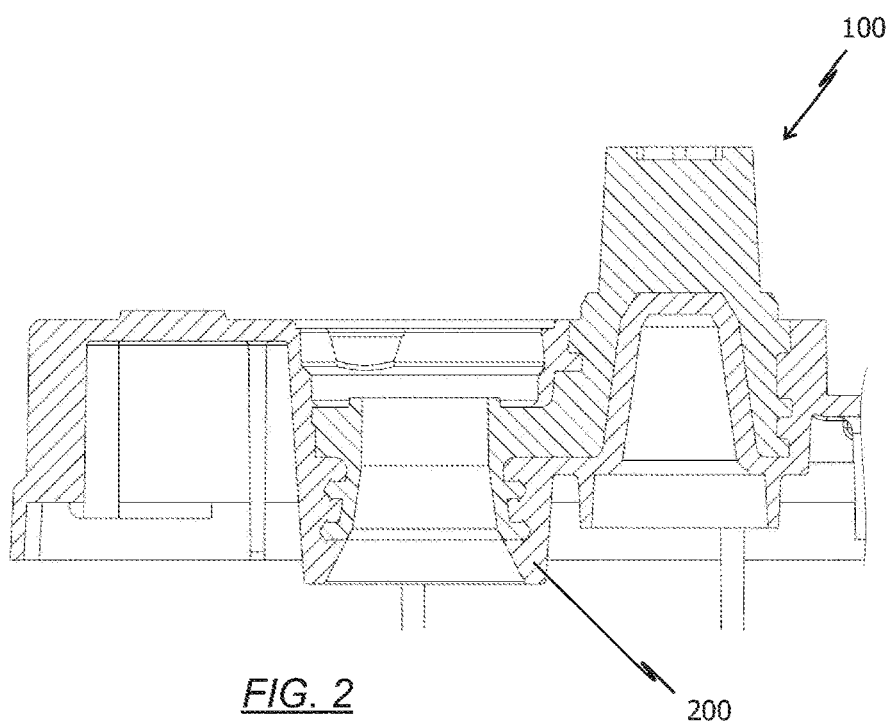
FIG. 2 is a schematic illustration of a sectional view of the offset pole socket inserted into a housing of an energy storage system.

FIG. 1A shows a perspective illustration of the offset pole socket 100 according to the invention. As shown in FIG. 1A, the offset pole socket has a contacting element 20 and a connection element 10 which is connected to the contacting element 20 by means of a connecting element 30.

Here, the connection element 10, which is attached on one side (a first end region) of the connecting element 30, extends in an upward direction from said connecting element as seen in FIG. 1A, and the contacting element 20, which is arranged on the other side (a second end region) of the connecting element 30, extends parallel with respect to the connection element 10 in the opposite direction, specifically downward from the connecting element 30 as seen in FIG. 1A.

The connection element 10, the connecting element and the contacting element 20 may in particular be of integral form. In other embodiments, however, these could also be cohesively connected to one another.

The connection element 10 according to the first embodiment may be of single-part form and at least substantially have the shape of a cone. Alternatively, a different geometry of the connection element 10 is also conceivable, for example the shape of a cylinder or a truncated pyramid.

The plus sign shown on the top side of the connection element 10 in FIG. 1A is illustrated merely by way of example in order to indicate the polarity of the pole socket and thus of the terminal to the user in a simple and fast manner. It is of course self-evidently also conceivable for the pole socket 100 illustrated in FIG. 1A to be used for the negative terminal. There would then correspondingly be a minus sign instead of the plus sign. Alternatively, it would also be possible for the plus or minus sign to be omitted entirely or for some other symbol to be selected.

Figure 1B:
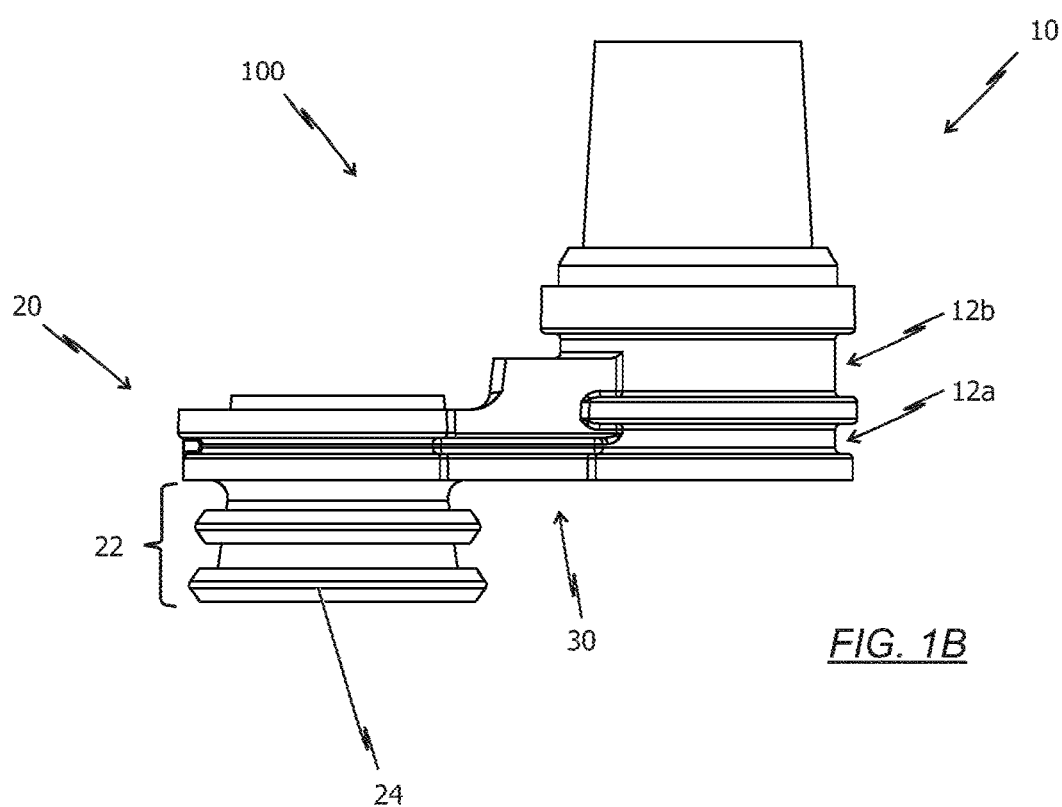
FIG. 1B is a schematic illustration of the first embodiment of the pole socket in a front view.

FIG. 1B shows a front view of the pole socket 100 according to FIG. 1A. It can be seen that the contacting element 20 is arranged so as to be offset both horizontally (that is to say perpendicularly to the direction of extent of the contacting element 20) and vertically (that is to say along or parallel to the direction of extent of the contacting element 20).

It is clear from FIG. 1B that a lower end of the connection part 10 terminates at least substantially flush with a bottom side of the connecting element 30 and the connection part 10 extends upward beyond a top side of the connecting element 30.

The contacting element 20 extends from an upper end, which terminates at least substantially flush with the top side of the connecting element 30, downward (that is to say in the opposite direction to the connection element 10) beyond the bottom side of the connecting element 30.

Here, the connecting element 30 may be of stepped form such that it has at least one step. In particular, the step may be formed such that the first side or the first end region of the connecting element 30, which adjoins the connection element 10, has a greater thickness than the second side or the second end region, which adjoins the contacting element 20.

In this way, it can advantageously be ensured that the offset pole socket does not fail even if high currents have to be conducted in a short time, which can lead to a temperature increase of the pole socket 100. Through the provision of an accumulation of material (that is to say the step), it can thus be ensured that the connection between the contacting element 20 and the connection element 10 can be permanently ensured and safeguarded despite the temperature increase.

The formation of such a step of the connecting element 30 also has an advantageous effect on the cooling process of the material of the housing 200, in particular of the cover of the housing 200, while the offset pole socket 100 is being inserted into the housing or overmolded therewith. In other words, during the insertion of the offset pole socket 100, this can be overmolded, for example by means of an injection molding or transfer molding process, with the material of the housing 200, in particular with the material of the cover of the housing 200. Here, the step which is arranged in the connecting element 30 adjacent to the connection element 10 has the effect that the material of the housing 200 cools faster and more homogeneously, since an accumulation of material of the housing 200 (at least in this region) can be avoided. It is thus advantageously possible to prevent a gap, which has an adverse effect on the quality of the connection, from forming between the material of the housing 200 and the surface of the offset pole socket 100, and in particular between the material of the housing 200 and the surface of the connecting element 30, during the cooling process.

FIG. 1B furthermore shows that the contacting element 20 has a labyrinth region 22. The labyrinth region 22 serves to ensure that gases and/or liquids cannot escape into or out of the housing 200 of the energy storage system. For this purpose, the labyrinth region 22 has at least one (encircling) projection 24 which has at least one undercut, specifically such that improved sealing properties are ensured.

Additional environmentally harmful coatings for sealing can be omitted, which furthermore simplifies the installation and assembly of the energy storage system.

In the situation shown in FIG. 1B, the contacting element 20 has two fully encircling projections 24 in the labyrinth region 22, which projections are arranged so as to be spaced apart from one another and each have two undercuts.

As illustrated in FIGS. 1A and 1B, the connection part 10 may have at least one groove 12a, 12b in a lower region of the connection part 10. On the one hand, a weight optimization can be ensured in this way, and on the other hand, a securing action in the event of tensile load can advantageously be ensured in this way. Furthermore, the at least one groove 12a, 12b has the effect that the bending stiffness of the offset pole socket 100 is improved.

Figure 1C:
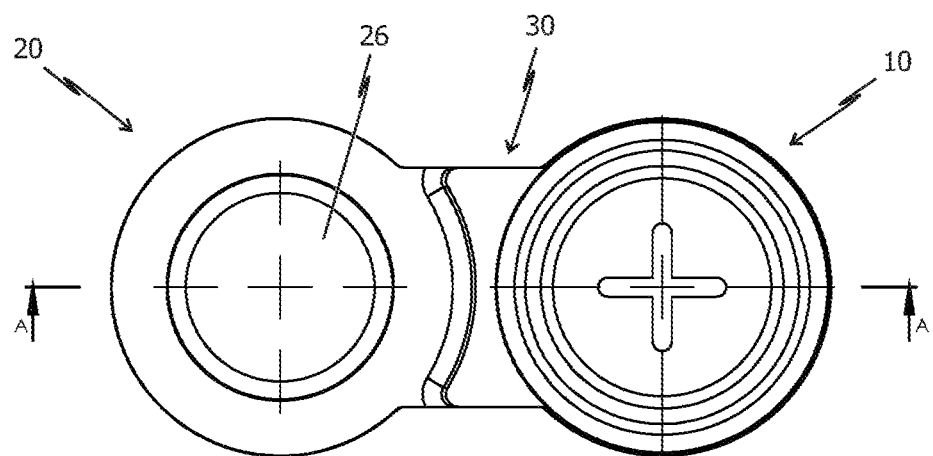
FIG. 1C is a schematic illustration of the first embodiment of the pole socket in a plan view.

FIG. 1C shows the pole socket 100 according to the invention in a plan view from above. It can be seen in said figure that the outline of the offset pole socket 100 has at least substantially the shape of a bone/of a dumbbell. In other words, the offset pole socket 100 has a waisted configuration, specifically such that the connecting element 30 has a width which is smaller than the diameter of the connection element 10 and/or than the diameter of the connection element 20.

Furthermore, owing to the rotationally asymmetrical shape of the offset pole socket 100, a rotation-preventing securing action can advantageously be automatically ensured.

In the embodiment shown in FIG. 1C, the sides of the connecting element 30 are formed so as to be straight and parallel to one another.

It is however equally also conceivable for at least one of the two sides, or both, to be of curved form or to be of tapering form toward the connection element 10 or toward the contacting element 20.

For example, the (thinnest) width of the connecting element 30 may be greater than at least the smallest diameter of a through opening 26 of the contacting element 20. It can thus be ensured that the connecting element 30 does not break even when conducting high currents.

The waisted shape of the pole socket 100 has the effect, in relation to conventional offset pole sockets, in the case of which the outline of the offset pole socket substantially corresponds to the shape of an elongated hole contour, on the one hand that material (that is to say lead) can be saved, and on the other hand that the developed or unrolled length of the encircling groove 12a is lengthened in relation to the developed or unrolled length of the groove in a conventional offset pole socket, which is associated with an improved bending stiffness and with an increased resistance to tensile loads.

Owing to the arrangement of the encircling grooves 12a, 12b, it can be prevented that the detachment from the housing 200 (in particular from the cover of the housing 200) of the energy storage system can be prevented in the event of a tensile load in the connection region of the connection element 10. More specifically, both the groove 12a, which at least substantially fully encircles the connection element 10, the connecting element 30 and the contacting element 20, and the groove 12b, which encircles only the connection element 10, prevent the detachment of the offset pole socket 100 and thus ensure that the pole socket 100 is secured in the housing 200 of the energy storage system in the event of tensile load.

It can also be seen in FIG. 1C that a through opening 26 is formed in the contacting element 20, through which through opening a pole shaft or a cell connector element or cell connector, which conducts the collected current from the energy storage cells to the pole socket 100, is passed or introduced. The contacting element 20 is formed here so as to be cohesively connected, in particular welded, to the pole shaft or the cell connector.

Figure 1D:
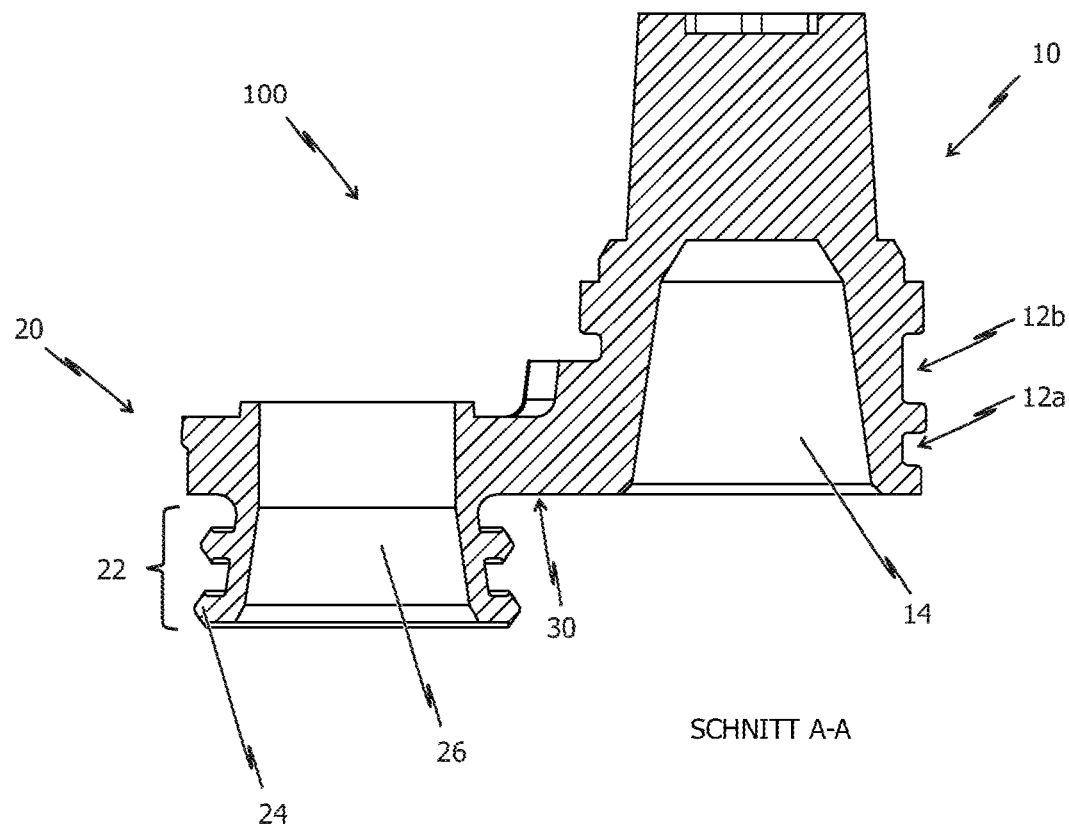
FIG. 1D is a schematic illustration of a sectional view of the first embodiment of the pole socket.

FIG. 1D shows the offset pole socket 100 in a sectional illustration. It can be seen here that the connection element 10 has a recess 14 in a lower region. In this way, material and thus weight and costs can advantageously be saved. In particular, material (that is to say lead) can be reduced by approximately up to 25%.

The recess 14 may for example at least substantially have the form of a (truncated) conical blind hole. Other shapes, for example a cylindrical shape, a (truncated) pyramid shape or recesses 14 with other geometrical outlines, are however equally likewise conceivably possible. It is also conceivable for one or more additional channels to be arranged along the wall surface of the recess 14, which channels run rectilinearly or in spiral fashion in the direction of extent of the recess 14. In this way, an improved connection to the housing 200, in particular the cover of the housing 200, can be achieved in the inserted state. For example, such channels may have a shape that is complementary to an involute toothing. In other words, the outline of the recess 14 may for example at least substantially correspond to the shape of a toothed gear.

It can also be seen that the at least one encircling projection 24 (in FIG. 1D: two encircling projections 24) of the contacting element is of at least substantially symmetrical form. In particular, the cross section of the encircling projection 24 as illustrated in FIG. 1D is arrow-shaped. Alternatively, the cross section of the encircling projection 24 could also be of T-shaped form.

Although this is not explicitly illustrated in the figures, it is equally conceivable that the encircling projection 24 or multiple encircling projections or all encircling projections 24 are of asymmetrical form and for example form only one undercut. In particular, the cross section of at least one encircling projection 24 could be C-shaped and/or L-shaped.

Although this is not illustrated in the figures, it is conceivable for at least one projection 24 to be of fully encircling form and for one projection, in particular a projection situated closer in the direction of the interior space of the housing 200 of the energy storage system, to be of intermittent (that is to say interrupted) and/or spiral-shaped form.

FIG. 2 is a schematic illustration of the pole socket 100 received and arranged in a part of the housing 200 of the energy storage system. As illustrated in FIG. 2, the offset pole socket 100 is received and surrounded by a material of the housing 200 and in particular of a cover or cover element of the housing 200 of the energy storage system.

In particular, the contacting element 20 (and also the connecting element 30) may be inserted at least substantially entirely into the housing 200 or the cover element, whereas only a lower region of the connection element 10 is surrounded by material of the housing 200 or the cover element of the housing 200.

In particular, the grooves 12a, 12b encircling at least the connection element 10 are filled with or surrounded by a material of the housing 200 or of the cover element of the housing 200. This can prevent the offset pole socket 100 from becoming detached from the housing 200 or from the cover element of the housing 200 in the event of a tensile load. In particular, the groove 12a, which runs in encircling fashion at least around the connection element 10, and in particular in at least substantially fully encircling fashion around the connection element 10, the connecting element 30 and the contacting element 20, serves for securing the pole socket 100 in the event of tensile load.

Since the offset pole socket 100 according to the present invention has a waisted configuration such that a width of the connecting element 30 is smaller than a diameter of the connection element 10 and/or smaller than a diameter of the contacting element 20, the security with respect to an (external) tensile load is increased in relation to the conventional case in which the width of the connecting element at least substantially corresponds to the diameters of the contacting element and of the connection element.

In other words, by lengthening the developed groove length, the bending resistance and the resistance of the offset pole socket 100 to tensile loads are improved.

It should be noted here that, in the inserted state of the offset pole socket 100 in the housing 200 of the energy storage system, at least substantially all of the grooves 12a, 12b and projections 24 are surrounded by material of the housing 200. This can be achieved easily and inexpensively for example by means of an injection molding or transfer molding process.

FIGS. 3A to 3D show a further embodiment of the offset pole socket 100 according to the invention. In the following, only the differences in relation to the above-described pole socket 100 according to the first embodiment will be discussed, wherein a repeated description of identical or equivalent elements will not be given.

Figure 3A:
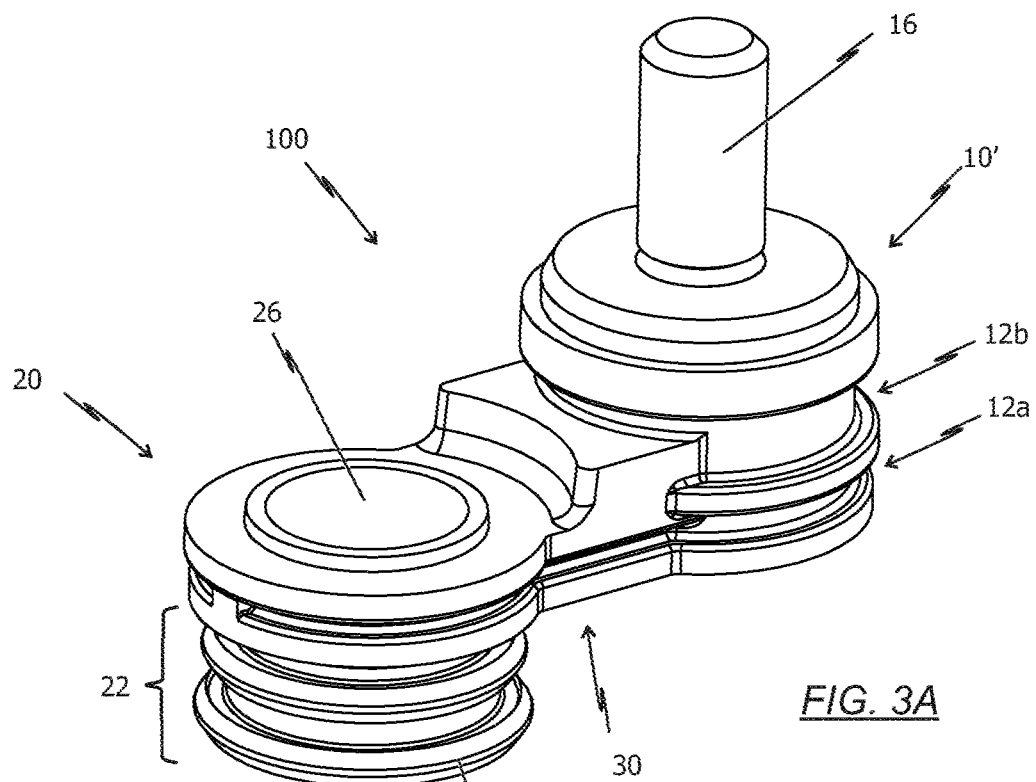
FIG. 3A is a perspective illustration of a second embodiment of a pole socket.
Figure 3B:
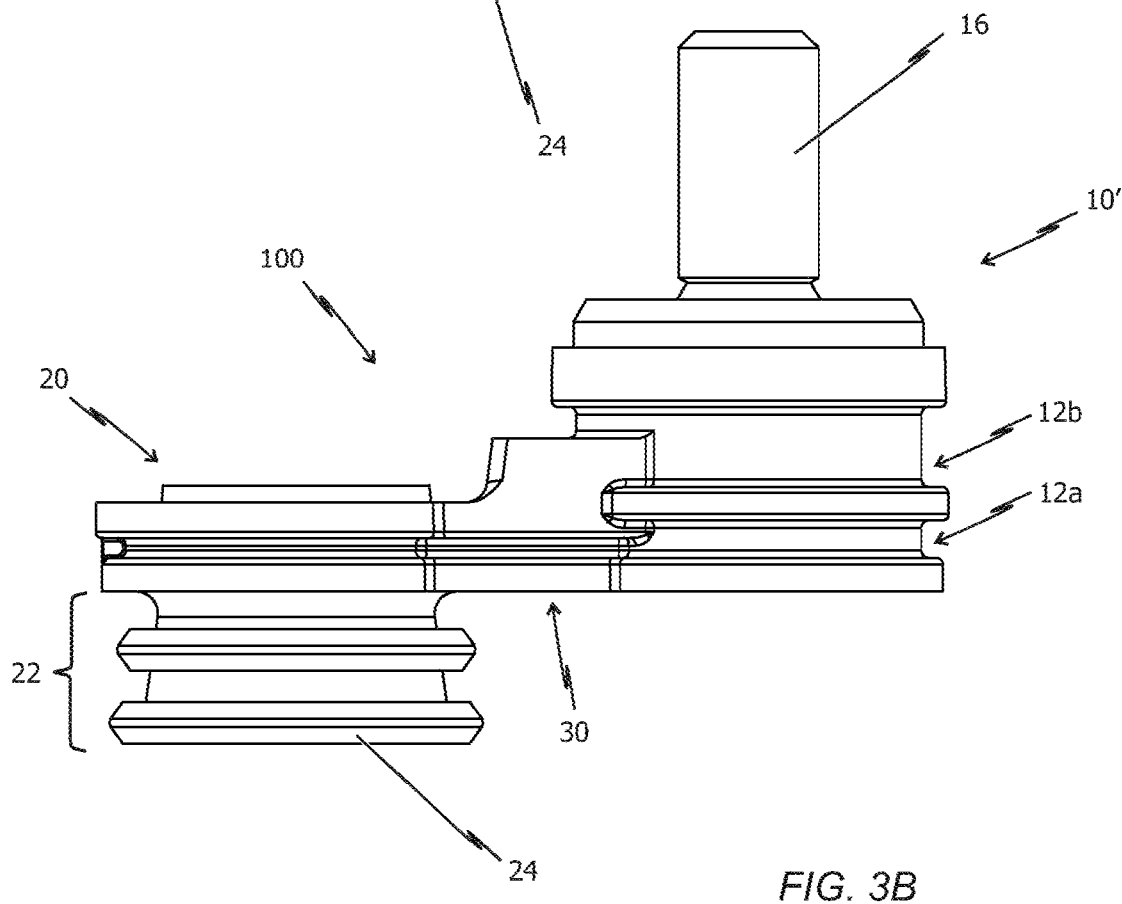
FIG. 3B is a schematic illustration of a front view of the second embodiment of the offset pole socket.
Figure 3C:
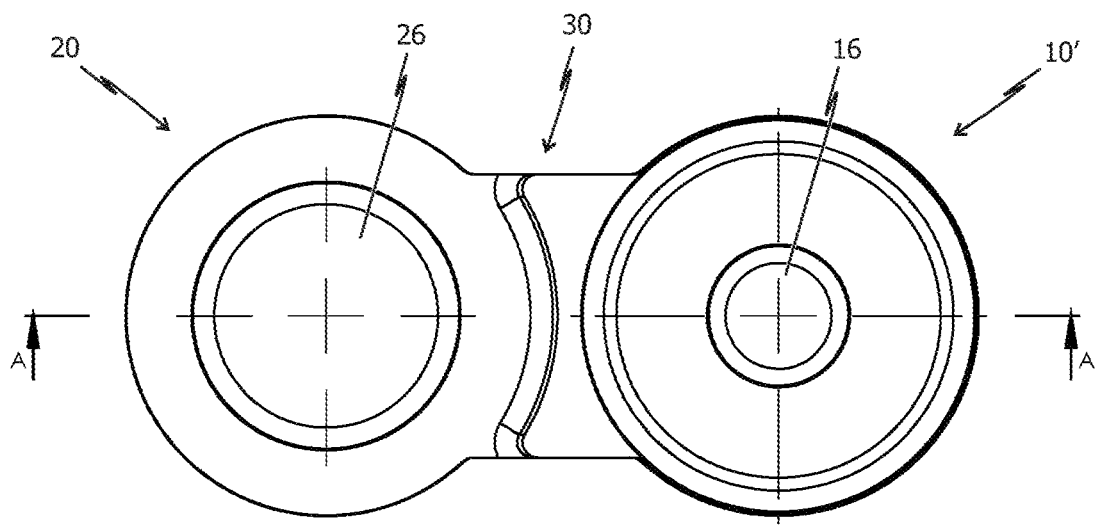
FIG. 3C is a schematic illustration of a plan view of the second embodiment of the pole socket.
Figure 3D:
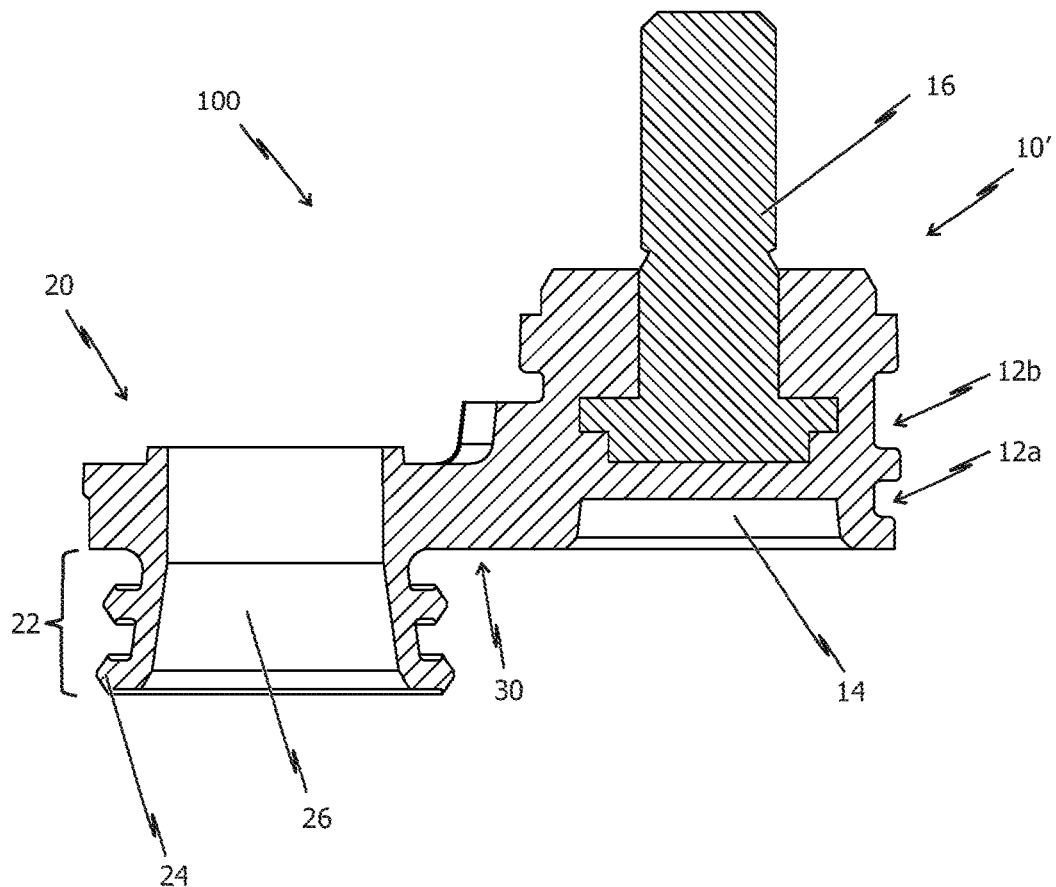
FIG. 3D is a schematic illustration of a sectional view of the second embodiment of the pole socket.

FIG. 3A shows an offset pole socket 100 of a second embodiment, which has at least substantially a similar structure to the pole socket 100 according to the first embodiment. In other words, the pole socket 100 according to the second embodiment has a contacting element 20 and connecting element 30, which substantially correspond to the contacting element 20 and the connecting element 30 of the first embodiment and a more detailed description of which will be omitted in order to avoid repetition.

In relation to the first embodiment, in which the connection element 10 is of single-part form, the connection element 10' of the second embodiment is of at least two-part form. Here, the orientation and in particular the direction of extent are similar to that in the first embodiment.

The offset pole socket 100 according to the second embodiment has at least one threaded insert 16 for making electrical contact with electrical consumers, which threaded insert is inserted in a lower region of the connection element 10' and is preferably encapsulated.

Owing to the two-part embodiment of the connection element 10', the shape of the connection element 10' is accordingly changed. More specifically, the recess 14 is formed so as to be less deep than in the first embodiment described above.

It is also the case in the further embodiment that the contacting element 20, the connecting element 30 and the connection element 10' (in particular that part of the connection element 10' which receives the threaded insert 16) may be of integral form. It is however equally also conceivable for said elements to be cohesively connected to one another.

In summary, according to this application, offset pole sockets 100 are provided and specified which are weight-optimized and are more stable than conventional offset pole sockets. In particular, a weight saving of up to 25% in relation to conventional offset pole sockets can be achieved, wherein improved security with respect to tensile loads and/or improved sealing properties can be achieved at the same time.

Although the figures illustrate only offset pole sockets 100 which have both the above-described labyrinth region 22 in the contacting element 20 and the above-described grooves 12a, 12b, it is equally conceivable that an offset pole socket 100 has only the grooves 12a, 12b (and the waisted configuration in the region of the connecting element 30) or the above-described labyrinth region 22.

At this point it should be noted that all of the parts described above, considered individually or in any combination, in particular the details illustrated in the drawings, are claimed as being essential to the invention. Amendments thereto are familiar to the person skilled in the art.

LIST OF REFERENCE DESIGNATIONS

100 Offset pole socket
10, 10' Connection element
12a, 12b Groove
14 Recess
16 Threaded insert
20 Contacting element
22 Labyrinth region
24 Projection
26 Through opening
30 Connecting element
200 Housing of the energy storage system

The invention claimed is:

1. A pole socket for a lead-acid energy storage system, wherein the pole socket has the following:
   a connecting element with a first end region and with a second end region situated at least substantially opposite the first end region;
   a connection element which is arranged on the first end region of the connecting element and which is configured to make electrical contact with electrical consumers; and
   a contacting element which is arranged on the second end region of the connecting element and which is configured to make electrical contact with a pole shaft,
   wherein the connection element extends in a first direction of extent proceeding from the connecting element, and wherein the contacting element extends in a second direction of extent proceeding from the connecting element, wherein the second direction of extent runs parallel and in the opposite direction with respect to the first direction of extent, such that the contacting element is arranged offset from the connection element,
   wherein the connection element has an upper region for making contact with the electrical consumers and a lower region which is configured to engage with a material of a housing, wherein at least one groove is arranged in the lower region, with the at least one groove terminating prior to the contacting element.

2. The pole socket as claimed in claim 1, wherein the at least one groove is of encircling form around at least the connection element.

3. The pole socket as claimed in claim 1, wherein the lower region of the connection element has an additional groove which is of encircling form around at least the connection element.

4. The pole socket as claimed in claim 1, wherein the contacting element has a labyrinth region in which an at least one projection with at least one undercut is formed.

5. The pole socket as claimed in claim 4, wherein the at least one projection is of fully encircling form.

6. The pole socket as claimed in claim 4, wherein at least one projection is of intermittent and/or spiral-shaped encircling form.

7. The pole socket as claimed in claim 4, wherein at least one projection has a symmetrical cross section, which is of at least substantially arrow-shaped or T-shaped form.

8. The pole socket as claimed in claim 4, wherein at least one projection has an asymmetrical cross section, which is of L-shaped form.

9. The pole socket as claimed in claim 1, wherein the pole socket has a waisted configuration, specifically such that a width of the connecting element is smaller than at least one of a first diameter of the connection element and smaller than a second diameter of the contacting element.

10. The pole socket as claimed in claim 1, wherein at least one side of the connecting element is of rectilinear form, and/or
    wherein at least one side of the connecting element is of curved form.

11. The pole socket as claimed in claim 1, wherein the connection element is of single part form and in the form of a cone.

12. The pole socket as claimed in claim 1, wherein the connection element is of at least two-part form, wherein at least one threaded insert is encapsulated by a region of the connection element.

13. The pole socket as claimed in claim 1, wherein the connection element, the connecting element and the contacting element are of integral form.

14. The pole socket as claimed in claim 1, wherein the pole socket is configured to be cast into or overmolded with a housing of the energy storage system.

15. The pole socket as claimed in claim 1, wherein the connection element has a recess.

16. The pole socket as claimed in claim 1, wherein the contacting element has a through opening.

17. The pole socket as claimed in claim 16, wherein the through opening is of tapering form.

18. The pole socket as claimed in claim 16, wherein the through opening is formed such that, the through opening has at least two regions of different inclination, or wherein the through opening is of continuously tapering form.

* * * * *

UNITED STATES PATENT AND TRADEMARK OFFICE
CERTIFICATE OF CORRECTION

| | |
|---|---|
| PATENT NO. | : 11,901,588 B2 |
| APPLICATION NO. | : 17/436261 |
| DATED | : February 13, 2024 |
| INVENTOR(S) | : Firl et al. |

It is certified that error appears in the above-identified patent and that said Letters Patent is hereby corrected as shown below:

In the Claims

In Column 12, Line 41, in Claim 18, delete "such that," and insert -- such that --, therefor.

Signed and Sealed this
Seventh Day of May, 2024

Katherine Kelly Vidal
Director of the United States Patent and Trademark Office